United States Patent
Kurtz et al.

(10) Patent No.: US 6,877,379 B2
(45) Date of Patent: Apr. 12, 2005

(54) DOUBLY COMPENSATED PRESSURE TRANSDUCER

(75) Inventors: Anthony D. Kurtz, Ridgewood, NJ (US); Joseph R. Van DeWeert, Cliffside Park, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 4 days.

(21) Appl. No.: 10/236,279

(22) Filed: Sep. 6, 2002

(65) Prior Publication Data

US 2004/0045359 A1 Mar. 11, 2004

(51) Int. Cl.⁷ .............................................. G01L 19/04
(52) U.S. Cl. ........................................................ 73/708
(58) Field of Search ........................ 73/708, 700, 1.71, 73/1.35

(56) References Cited

U.S. PATENT DOCUMENTS

| | | |
|---|---|---|
| 3,245,252 A | 4/1966 | First et al. |
| 4,192,005 A | 3/1980 | Kurtz |
| 4,419,620 A | 12/1983 | Kurtz et al. |
| 4,765,188 A * | 8/1988 | Krechmery et al. .......... 73/708 |
| 5,191,798 A * | 3/1993 | Tabata et al. .................. 73/727 |
| 5,253,532 A * | 10/1993 | Kamens ........................ 73/708 |
| 5,419,199 A | 5/1995 | Araki |
| 5,460,050 A | 10/1995 | Miyano |
| 5,481,905 A | 1/1996 | Pratt |
| 5,544,531 A | 8/1996 | Heckman |
| 5,663,507 A | 9/1997 | Westervelt et al. |
| 6,053,050 A | 4/2000 | Zahzah et al. |
| 6,107,861 A | 8/2000 | Mayer |
| 6,229,427 B1 | 5/2001 | Kurtz et al. |
| 6,272,929 B1 | 8/2001 | Kurtz et al. |
| 6,334,093 B1 | 12/2001 | More |

* cited by examiner

Primary Examiner—Edward Lefkowitz
Assistant Examiner—Andre Allen
(74) Attorney, Agent, or Firm—Plevy, Howard & Darcy PC

(57) ABSTRACT

The present invention relates to a compensated pressure transducer having a pressure transducer connected to a coarse temperature adjustment compensator and to a fine temperature adjustment compensator. The coarse temperature adjustment compensator includes an analog circuit and the fine temperature adjustment compensator includes a digital circuit. A pre-amplifier is connected between the pressure transducer and the fine temperature adjustment compensator.

19 Claims, 4 Drawing Sheets

US 6,877,379 B2

DOUBLY COMPENSATED PRESSURE TRANSDUCER

BACKGROUND OF THE INVENTION

1. Field of Invention

The present invention relates to semiconductor transducers and more particularly to an apparatus and method of compensating the output of the transducer for both temperature and pressure effects by using both discrete electrical elements and a microprocessor.

2. Description of the Related Art

The silicon pressure transducer is a well known device that has been used for many years. The assignee of the present invention holds many patents such as U.S. Pat. No. 6,229,427, entitled "Covered Sealed Pressure Transducers and Method for Making the Same" and U.S. Pat. No. 6,272,929, entitled "High Pressure Piezoresistive Transducer Suitable for use in Hostile Environments" that are directed at the construction of such transducers. These devices are by themselves highly accurate at room temperature, but changes in temperature can affect the electrical characteristics inducing errors into any measurements done at variable temperatures or non-optimal temperatures. Although the new leadless design is more accurate with temperature changes, it is still desirable to correct for temperature fluctuations. There are several known ways of compensating for these errors in temperature measurements. One such way is by using discrete resistors such as in U.S. Pat. No. 3,245,252, entitled "Temperature Compensated Semiconductor strain Gauge Unit". In this method the changes in resistance and sensitivity with temperature are used together to correct the output. Another method of compensating a transducer for temperature variations is by using discrete active semiconductor components such as op-amps to correct for pressure non-linearities. A method of this type is disclosed in U.S. Pat. No. 4,419,620, entitled "Linearizing Circuits for a Semiconductor Pressure Transducer".

In recent years microprocessors have been used to correct for errors arising from changes in temperature. While such uses were envisioned quite some time ago, as for example in U.S. Pat. No. 4,192,005, entitled "Compensated Pressure Transducer Employing Digital Processing Techniques", it is only recently that it has become practical to use such devices on a large scale. In such devices a Wheatstone bridge type pressure transducer is hooked up directly to a microprocessor chip. The microprocessor then uses an internal or external temperature sensor to sense the temperature of the bridge. It then uses internally stored constants to correct the output of the bridge such that the output stays relatively constant over the whole temperature range. Ideally with such a compensation scheme it would be possible to produce a very stable output over a large temperature range.

However there are limitations to what microprocessor correction can do. Standard compensation microprocessors are programmed at several temperature points and then use this information to correct linearly between the given temperature points, in that way it is possible to correct a wide range of temperatures without having to do an excessive amount of testing at temperature before hand. The problem arises when the transducers output does not change linearly between the temperature chosen. In this case errors result which are proportional to the non-linearities between the points chosen for compensation. Another limitation of the current microprocessors is that when a low output transducer is used with one the amplifier must be set at a very high gain; this high gain can make it more difficult to compensate the transducer very accurately; therefore currently, transducers must be chosen that have higher outputs and such transducers are often more non-linear with pressure. The proposed invention is a novel method of combining various compensation schemes together to more effectively and more easily compensate a silicon pressure transducer.

SUMMARY OF THE INVENTION

The present invention relates to a compensated pressure transducer having a pressure transducer connected to a coarse temperature adjustment compensator and to a fine temperature adjustment compensator.

In one embodiment, the coarse temperature adjustment compensator includes discrete electronic elements connected across the input and output of the pressure transducer and the fine temperature adjustment compensator includes a microprocessor.

In another embodiment, a pre-amplifier is connected between the pressure transducer and the fine temperature adjustment compensator.

DESCRIPTION OF THE FIGURES

Other objects and advantages of the invention will become apparent from the foregoing detailed description taken in connection with the accompanying drawings, in which.

DETAILED DESCRIPTION

Figure 1:
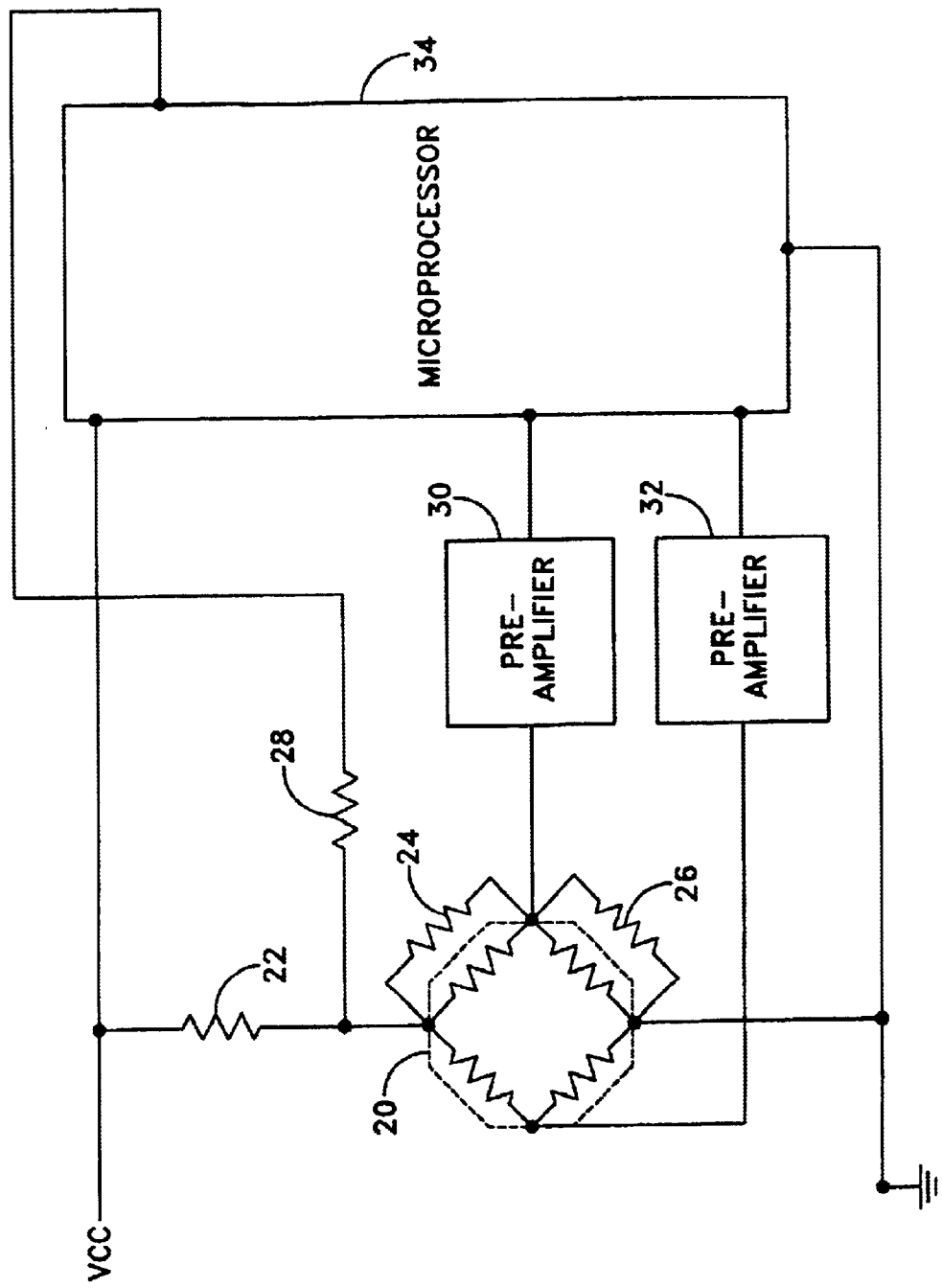
FIG. 1 illustrates the preferred embodiment of the of the patent consisting of several discrete components, a transducer in Wheatstone bridge configuration, and a digital microprocessor.

The present invention utilizes the placement of discrete electronic elements on the input and outputs of a silicon pressure transducer in a Wheatstone bridge configuration in such a way as to partially compensate the output before adding a digital correction microprocessor to further compensate the unit. In the current invention piezoresistive sensing elements are arrayed in a Wheatstone bridge in order to give a differential output voltage proportional to the applied pressure. These sensing elements would have a temperature coefficient of resistance which is positive with increasing temperature and a temperature coefficient of gauge factor which is in general negative with increasing temperature. In this way by adding a span resistor in series with the bridge and which does not change with a temperature the voltage across the bridge can be made to vary with temperature as in U.S. Pat. No. 3,245,252. This variation can be used to partially balance out the decreased output at higher temperatures as per the same patent. Discrete resistors could also be placed as shunts on individual legs of the bridge in order to adjust the offset of the bridge or to balance out part of the null temperature shift.

By partially compensating the transducer before the microprocessor it acts to make the job of the microprocessor easier. In this way it takes less time to compensate the unit with the microprocessor and the corrections it has to perform can be made smaller and therefore somewhat more accurate. Another advantage of the partially compensated transducer is that if for any reason the multiprocessor fails to function properly, perhaps due to exposure to too high a temperature and a subsequent loss of memory, then the output of the transducer will not be compensated by the digital correction and all of the errors will show up in the output. However if the transducer is already partially compensated with discrete resistors then the error of the already partially compensated transducer will not be as bad as in a completely uncompensated one. In this way the placement of discrete electronic elements on the input and outputs function to define a coarse temperature compensator and the microprocessor functions to define a fine tuning temperature compensator.

After the resistor elements, the output of the Wheatstone bridge is then sent into a pre-amplifier. This pre-amplifier is capable of both amplifying the output of the transducer and adding a fixed offset. At the present time many digital compensation microprocessors are not accurate when trying to compensate a low output transducers. This pre-amplifier will allow the use of much lower output transducers with standard digital correction microprocessors. This is desirable for several reasons. At the current time it is necessary to use a much higher output transducer, which means the silicon membrane of the transducer must be thinner thereby generating more strain and a greater output. Thinner membranes tend to be more non-linear with pressure and also tend to have larger temperature and pressure hysteresis. Non-linearity and hysteresis are problems that digital correction can not easily fix and therefore it is of great advantage to be able to use a lower output thicker transducer. The pre-amplifier also allows for an additional fixed offset which can be useful is some applications.

After the digital correction microprocessor corrects the output a portion of its output can then be fed back into the input of the transducer helping to correct for very small non-linearities in pressure.

To facilitate the understanding of this approach, the disclosures of U.S. Pat. Nos. 6,272,929, 6,229,427, 4,192,005, 4,419,620 and 3,245,252 are each incorporated herein by reference.

With reference to FIG. 1, a pressure transducer according to the present invention is composed of a four-arm Wheatstone bridge 20 is connected to several discrete resistors 22, 24, 26 and 28. It is further connected to two pre-amplifiers 30 and 32 which are composed of several discrete active electronic components and which are well known to those skilled in the art. Attached to said pre-amplifiers is a microprocessor 34.

Figure 2A:
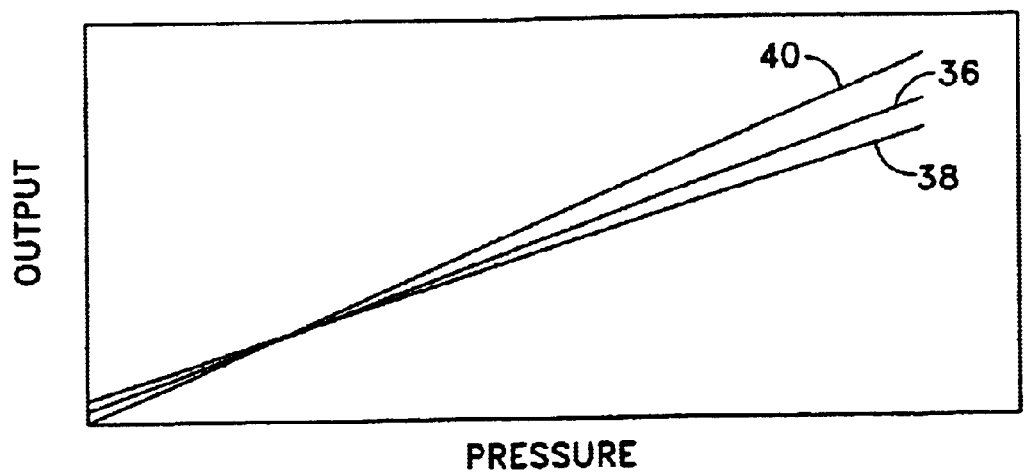
FIG. 2A illustrates curves of output versus applied pressure for curves at three different temperatures for uncompensated transducers.
Figure 2B:
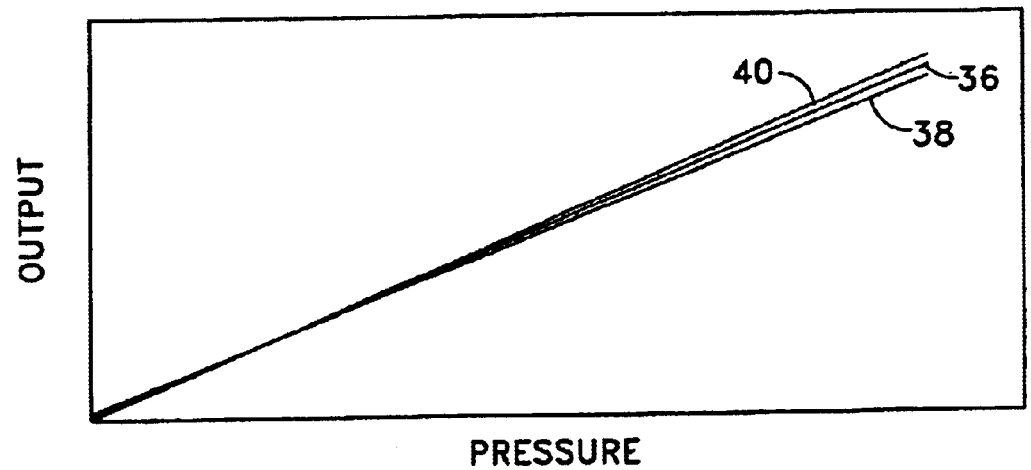
FIG. 2B illustrates curves of output versus applied pressure for three different temperatures of units after the initial compensation done before the digital correction.
Figure 2C:
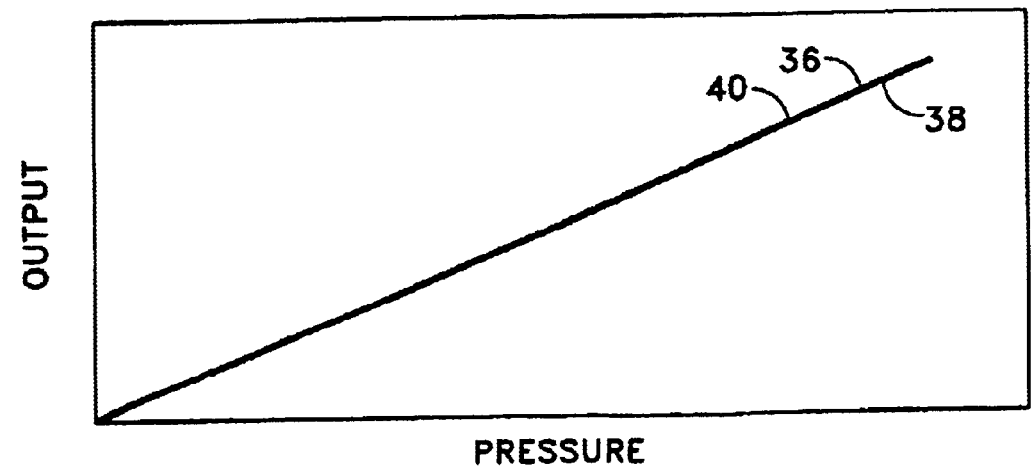
FIG. 2C illustrates curves of output versus applied pressure for the final output after all corrections.

The resistor 22 commonly known as a span resistor is used to compensate for temperature variations in output as in U.S. Pat. No. 3,245,252. Either resistor 24 or 26 can be used for null point corrections as in the above referenced patent. The results of these two corrections can be seen in the first two graphs (FIGS. 2A–B). The top graph shows the output of an uncompensated transducer at several temperatures. Line 36 represents the output at room temperature; line 38 represents the output at a lower temperature and line 40 represents the output at a higher temperature relative to room temperature. The middle graph shows the output of the same transducer after the addition of resistors 22 and 24 arranged according to the circuit of FIG. 1. It can be seen that the lines are moved closer together thus substantially decreasing the temperature induced offset or errors. By making the variation in output with temperature smaller it is easier for the digital correction circuit conducted by the microprocessor to even further reduce these errors. The bottom graph (FIG. 2C) illustrates this by the fact that all the lines are on top of each other meaning there is very little to no error introduced by variations in temperature. This reduced difficulty in digital compensation can greatly reduce the time it takes to compensate the transducers. The reduced error also allows for the use of less points of temperature correction or less selectivity of these points.

In traditional passive compensation schemes it is necessary to do very accurate and extensive tests in order to correctly choose resistances to accurately compensate the transducer. However in this new method of compensation the resistor values do not need to be as accurately chosen and often the same resistances may be used for a number of similar transducers. This is due to the fact that the final compensation will be accomplished by the digital microprocessor and so slight variations between transducers can be corrected for during the final calibration.

Figure 3:
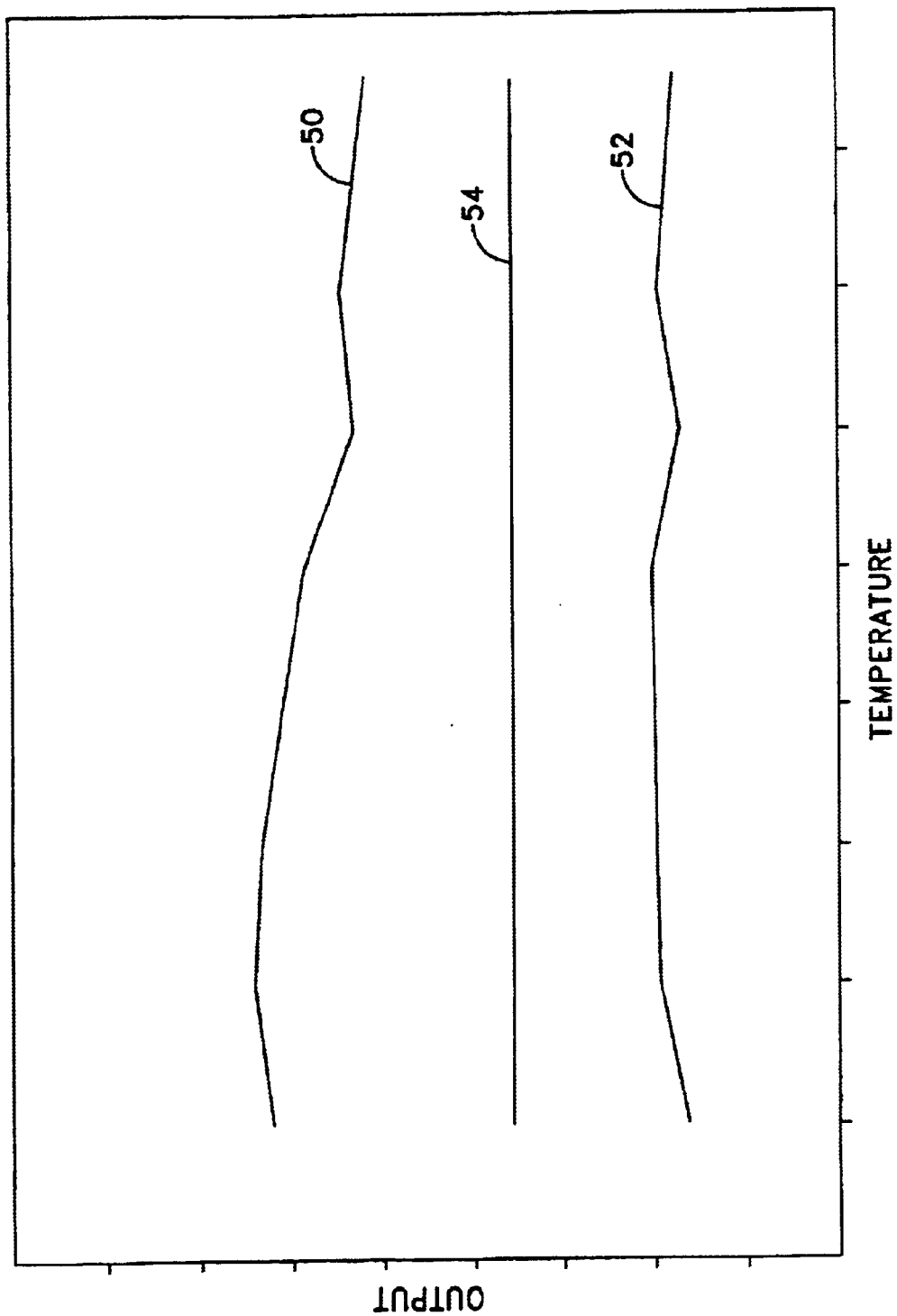
FIG. 3 illustrates output versus temperature for an uncompensated transducer and for a partially compensated transducer.

FIG. 3 shows another advantage that these two resistors add to an ordinary digital correction. The graph is of the output versus temperature for an uncompensated and partially compensated transducer. From the output of the uncompensated transducer 50 it can the seen that in general the output not only changes with temperature but it often does so non-linearly. In general most digital correction schemes can only correct these changes linearly, or at most quadratically, between the temperature points chosen for calibration. Therefore it is desirable to reduce the amount of non-linear change. Line 52 is a plot of the output: of the same transducer with a span resistor added. It is obvious that by choosing a suitable resistance the output can be flattened thereby reducing not only the total change with temperature but also the non-linearities in that change. After adding the span resistor it is then possible to choose temperature points suitable to creating line 54 which is the output after the fill correction.

Figure 4:
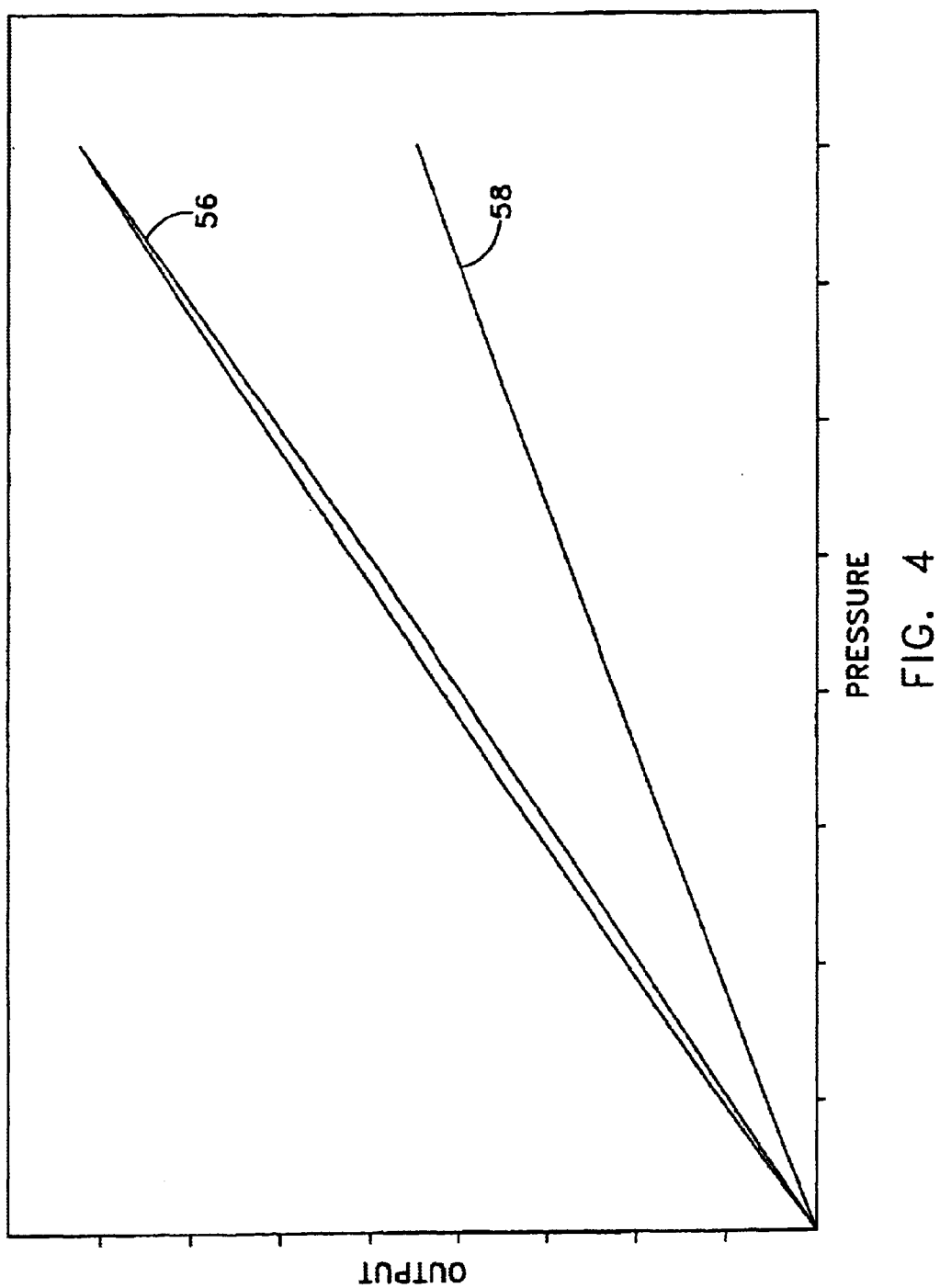
FIG. 4 illustrates output versus pressure for both a thin and thick uncompensated transducers.

FIG. 4 shows one of the advantages of using the pre-amplifiers to raise the output of the transducer prior to digital correction. Currently most microprocessors have a difficult time in making a very accurate compensation on a transducer that has a low output, this is due to the need for high gains and a difficulty in adjusting such high gains in an accurate manner. Line 56 shows the output of a relatively thin diaphragm high output transducer. It readily apparent that the output is both non-linear and hysteretic with pressure. While these errors are small, typically providing deviations in the range of 0.3–0.5%, they are still unacceptable when trying to make a highly accurate pressure measurement unit. Line 21 shows the output of a much thicker lower output transducer which is much more linear and has very small to no hysteresis. It is also true that the thinner diaphragm will have much more temperature hysteresis as well. Since both of these types of errors are very hard if not impossible to correct for in real time it is very advantageous to be able to use the thicker transducer. This is made possible by boosting the output with the pre-amplifiers.

The addition of the pre-amplifiers also allows for a standard offset to be added to the output by the use of discrete resistors in the circuitry of the pre-amplifiers. While digital correction microprocessors also allow for offsets to be added these offsets are often limited. Not only is the size of the allowed offsets limited but also often large offsets will cause some problems with linearity in the compensated output. The use of a pre-amplifier offset solves these problems by allowing for both easier and more accurate compensation.

Referring again to FIG. 1, a feedback resistor 28 is added to a path between the output of the microprocessor and the input of the Wheatstone bridge in the case of a pressure nonlinear transducer. This resistor allows for a small feedback of the output into the transducer raising the voltage across the Wheatstone bridge and thereby increasing the output slightly. This is similar to the compensation technique used in U.S. Pat. No. 4,419,620. This resistor feedback will only work for relatively small non-linearities and will not help errors due to hysteresis. Therefore it is not a substitute for the use of a pre-amplifier in most situations. It can be useful for relatively high pressure ranges where a thin high output transducer would not otherwise be necessary.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A compensated pressure transducer comprising:
    a pressure transducer;
    a coarse adjustment temperature compensator connected to said pressure transducer having discrete electronic elements on input and output leads of said pressure transducer; and
    a fine temperature adjustment compensator having a digital circuit connected to said pressure transducer.

2. The transducer of claim 1 wherein said discrete electronic elements each include at least one resistor.

3. The transducer of claim 1 wherein said digital circuit includes a microprocessor.

4. The transducer of claim 1 wherein said pressure transducer is a low output transducer, said transducer including at least one pre-amplifier connected between said pressure transducer and said fine adjustment temperature compensator.

5. The transducer of claim 1 wherein said fine temperature adjustment compensator is connected to said pressure transducer to receive signals processed first by said coarse temperature adjustment compensator.

6. A temperature compensated transducer circuit comprising:
    a pressure transducer;
    an analog temperature compensator connected across input and output leads of said pressure transducer; and
    a digital temperature compensator connected to receive the output of said pressure transducer.

7. The circuit of claim 6 wherein said analog temperature compensator includes at least one resistor.

8. The circuit of claim 6 wherein said analog temperature compensator provides a coarse temperature adjustment and said digital temperature compensator provides fine tuned temperature adjustment.

9. The circuit of claim 6 wherein said pressure transducer is a low voltage output transducer said circuit including a pre-amplification circuit between said pressure transducer and said digital temperature compensator.

10. The circuit of claim 6 where said digital temperature compensator includes a microprocessor.

11. The circuit of claim 6 wherein said analog temperature compensator includes a connection across a voltage supply lead and an output lead of said pressure transducer.

12. The circuit of claim 11 wherein said analog temperature compensator includes a connection across a ground lead and an output lead of said pressure transducer.

13. The circuit of claim 9 wherein said pre-amplification circuit includes an amplifier integrated circuit.

14. A compensated pressure transducer circuit comprising:
    a low output pressure transducer;
    discrete electronic elements, connected across input and output leads of said pressure transducer, for compensating for variations in ambient temperature to produce a compensated signal;
    an amplification circuit operatively connected to the output of said pressure transducer circuit to receive said compensated signal; and
    a digital circuit, connected to said amplifier circuit, for compensating said compensated signal to produce a doubly compensated signal.

15. The circuit of claim 14 wherein said discrete electronic elements are ordinary resistors.

16. The circuit of claim 15 wherein said digital circuit includes a microprocessor adapted by software to provide an output signal adjusted for variations in temperature relative to an output signal.

17. The circuit of claim 16 wherein said compensated signal is said input signal and said doubly compensated signal is said output signal.

18. The circuit of claim 17 wherein said amplifier circuit includes an amplifier integrated circuit.

19. The circuit of claim 14 wherein said pressure transducer is a non-linear transducer, said circuit includes a feedback lead having a feedback resistor connected between said transducer input and said digital circuit.

* * * * *